Aug. 3, 1965   E. A. THOMPSON   3,198,026
MECHANICO-HYDRAULIC POWER AND CONTROL UNIT
Original Filed Jan. 8, 1958                                16 Sheets-Sheet 1
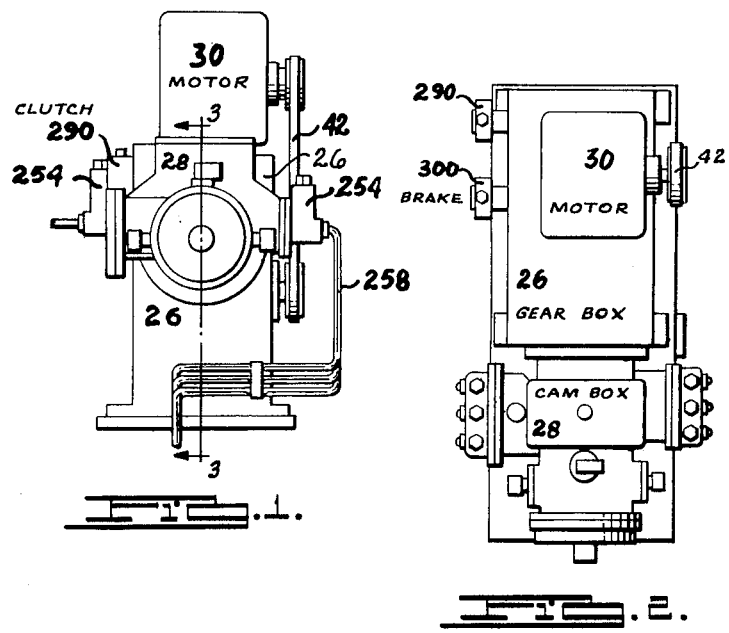
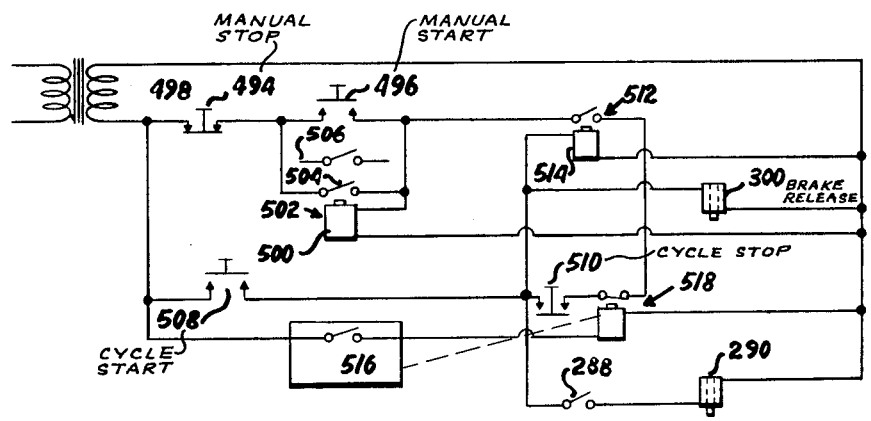
INVENTOR
EARL A THOMPSON
BY
Ralph R. Tweedale
ATTORNEY

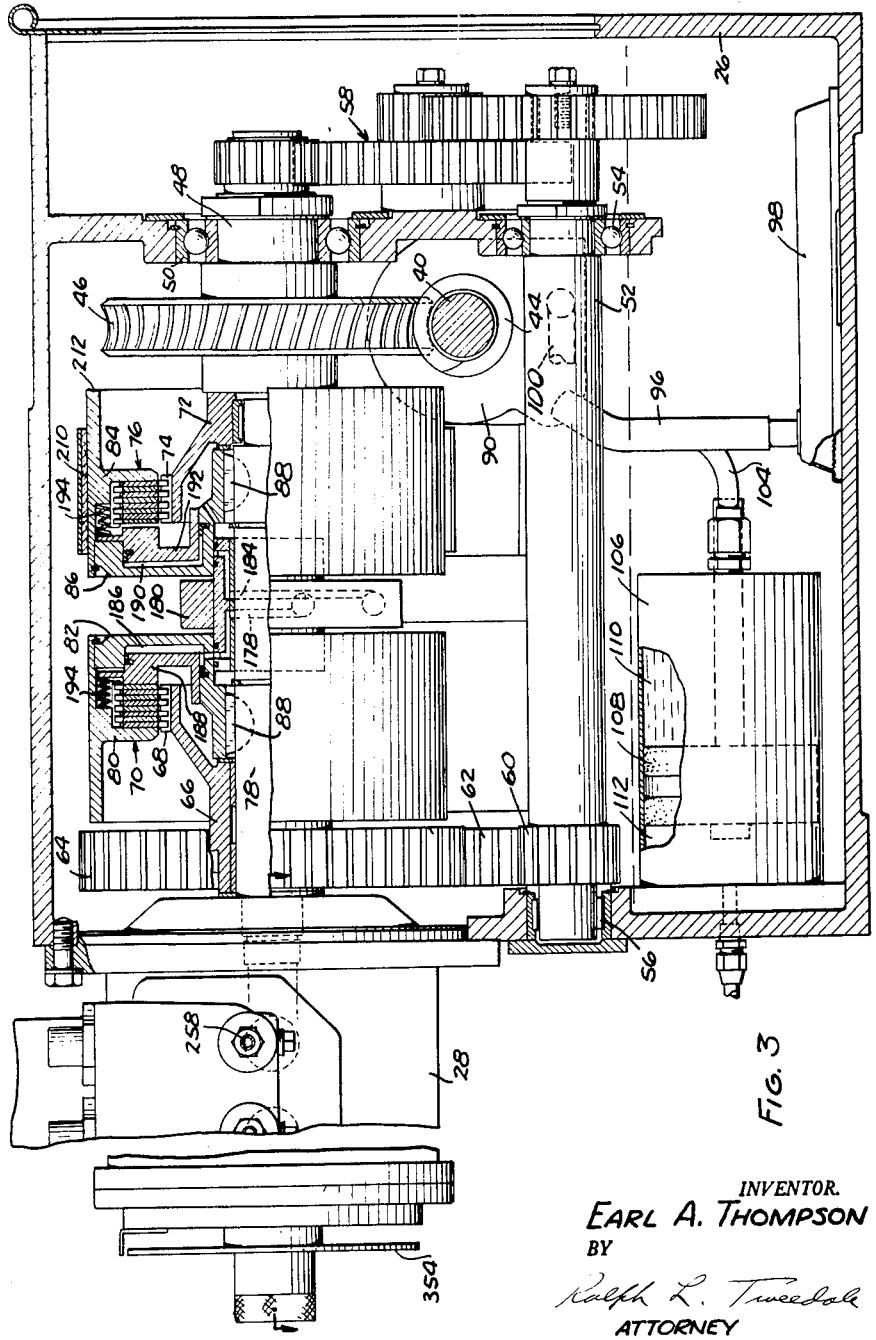

INVENTOR.
EARL A. THOMPSON
BY
Ralph L. Tweedale
ATTORNEY

INVENTOR.
EARL A. THOMPSON

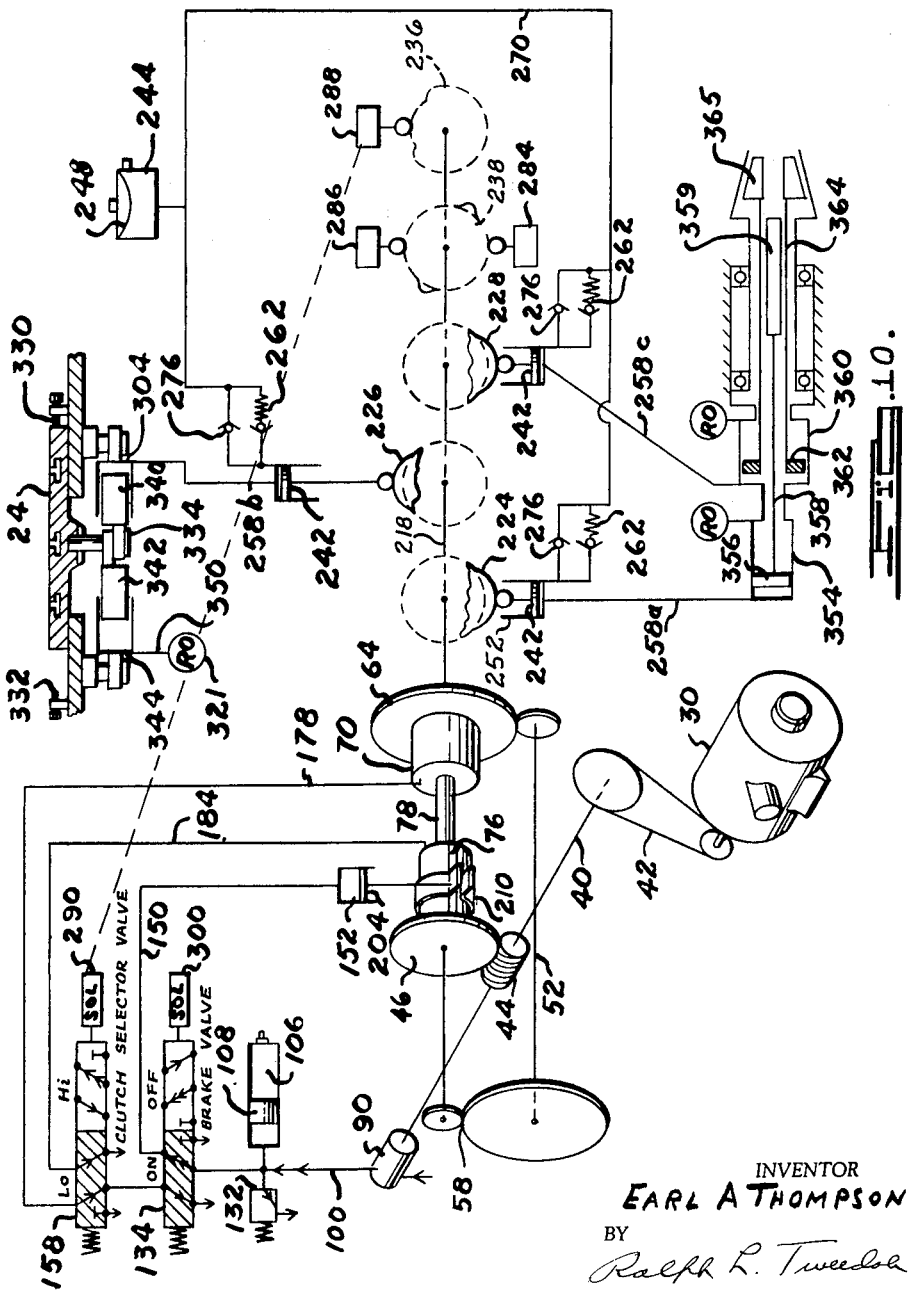

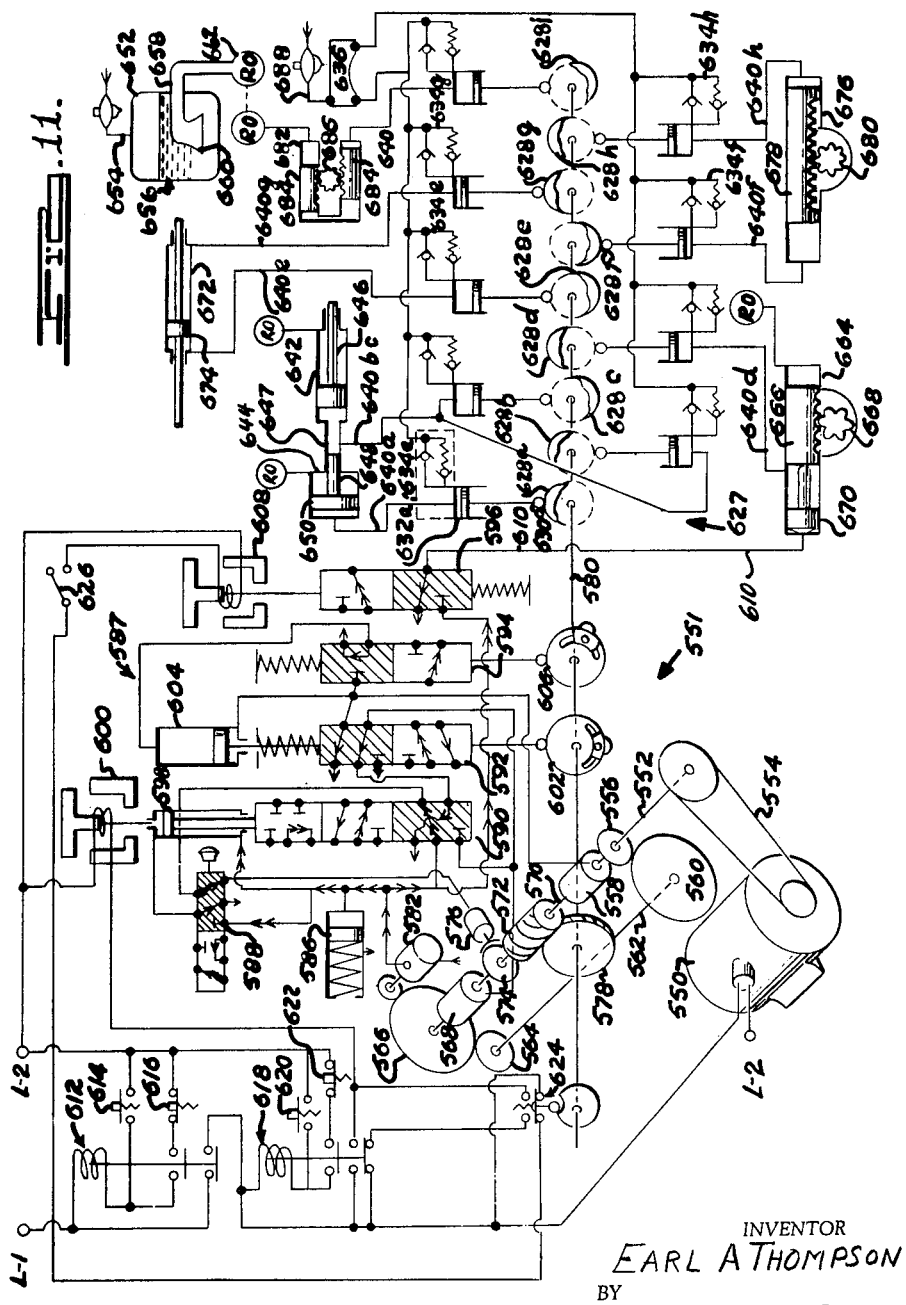

Aug. 3, 1965　　　　E. A. THOMPSON　　　　3,198,026
MECHANICO-HYDRAULIC POWER AND CONTROL UNIT
Original Filed Jan. 8, 1958　　　　　　　　16 Sheets-Sheet 9

INVENTOR
EARL A THOMPSON
BY
Ralph L. Tweedale
ATTORNEY

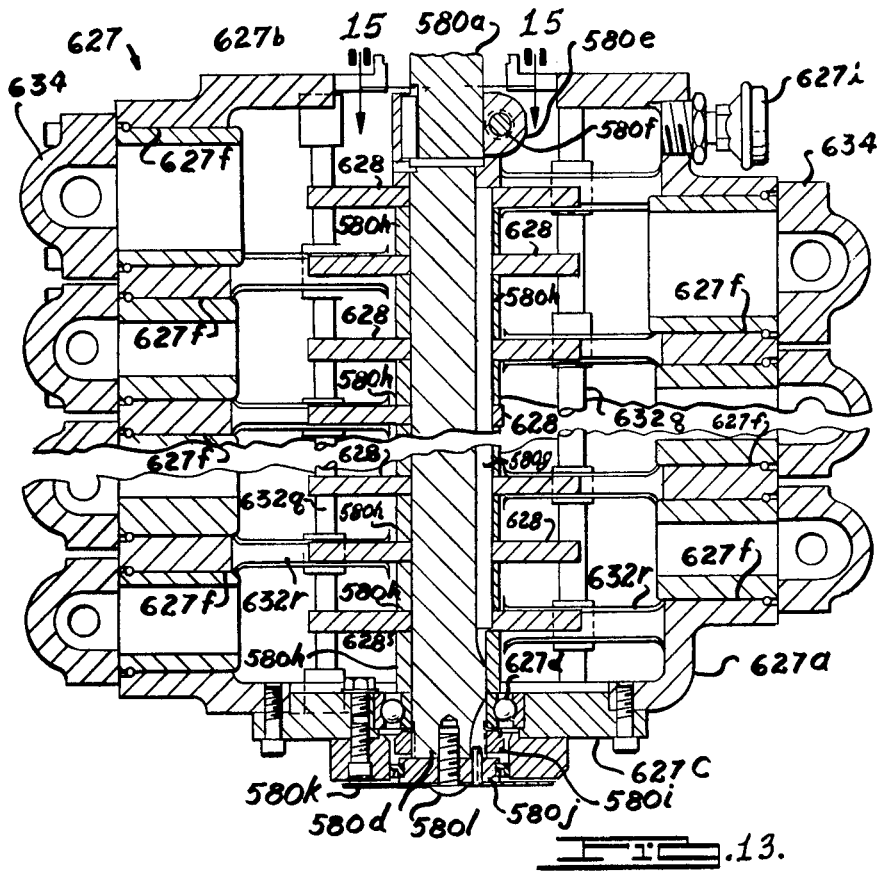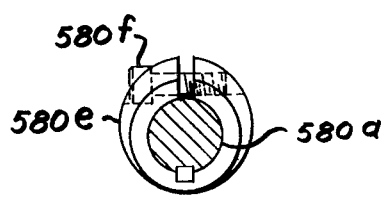
INVENTOR
EARL A THOMPSON
ATTORNEY

Aug. 3, 1965    E. A. THOMPSON    3,198,026
MECHANICO-HYDRAULIC POWER AND CONTROL UNIT
Original Filed Jan. 8, 1958    16 Sheets-Sheet 13

INVENTOR
EARL A THOMPSON
BY
ATTORNEY

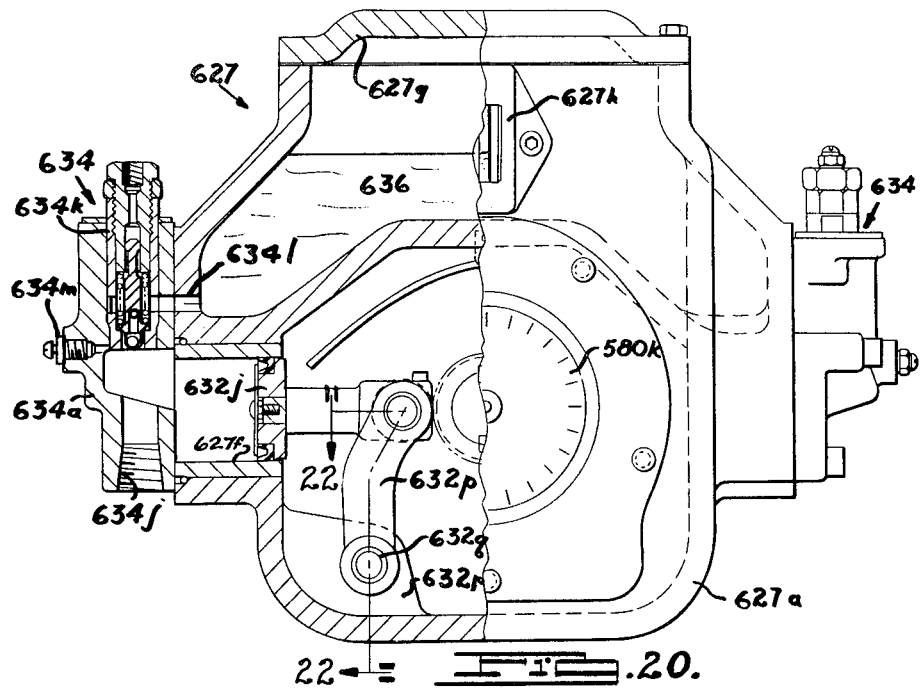
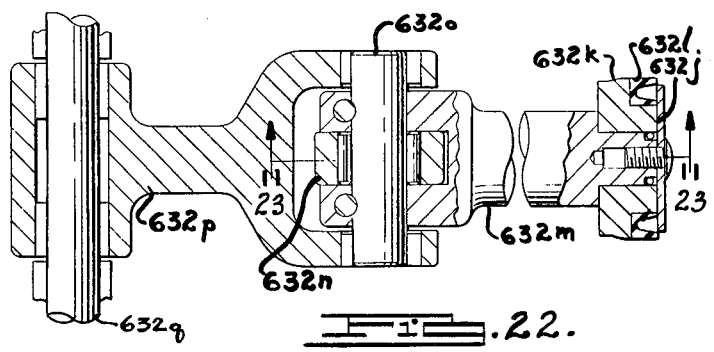
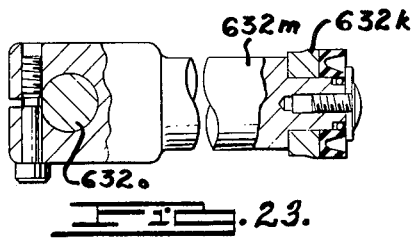

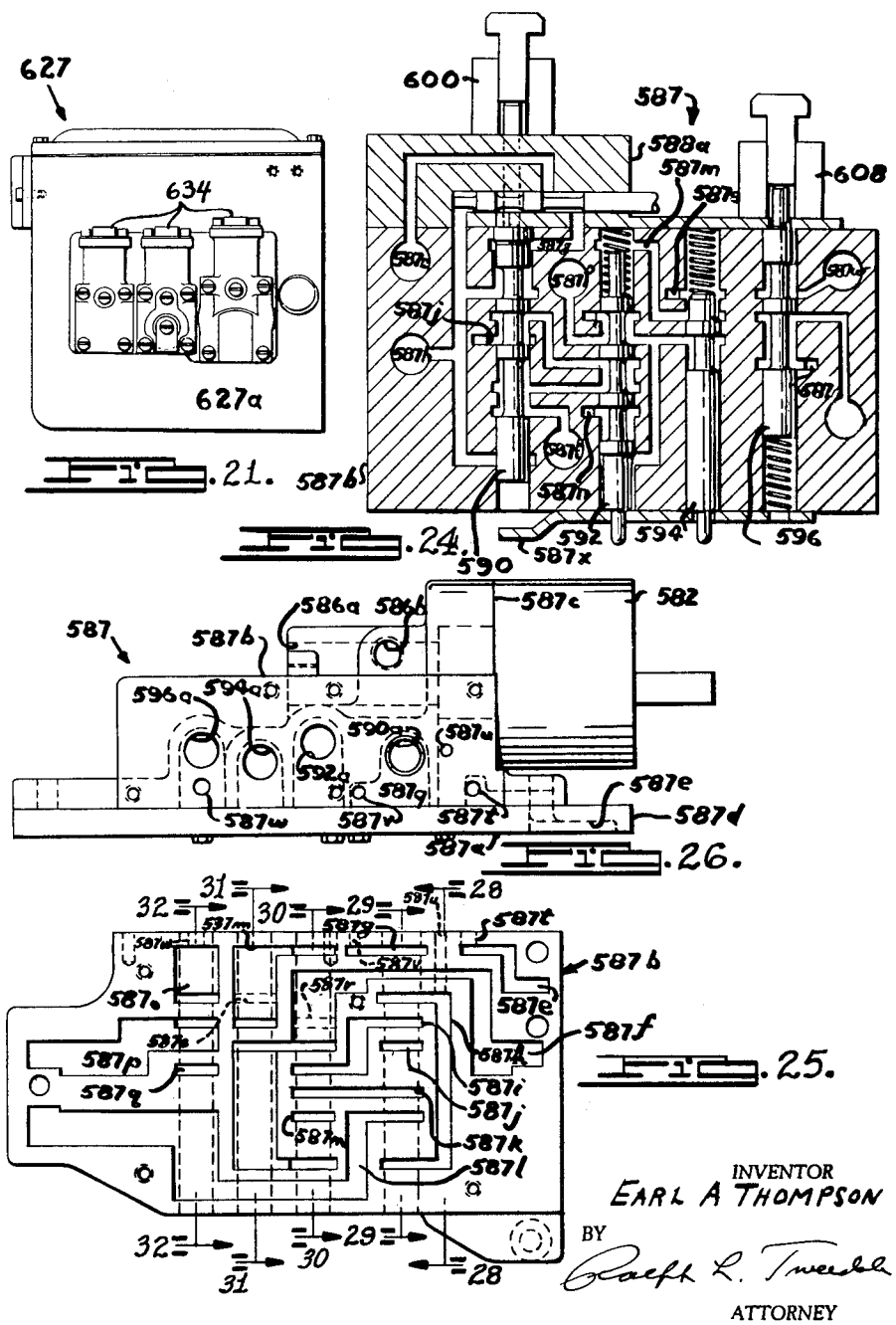

Aug. 3, 1965 E. A. THOMPSON 3,198,026
MECHANICO-HYDRAULIC POWER AND CONTROL UNIT
Original Filed Jan. 8, 1958 16 Sheets-Sheet 16
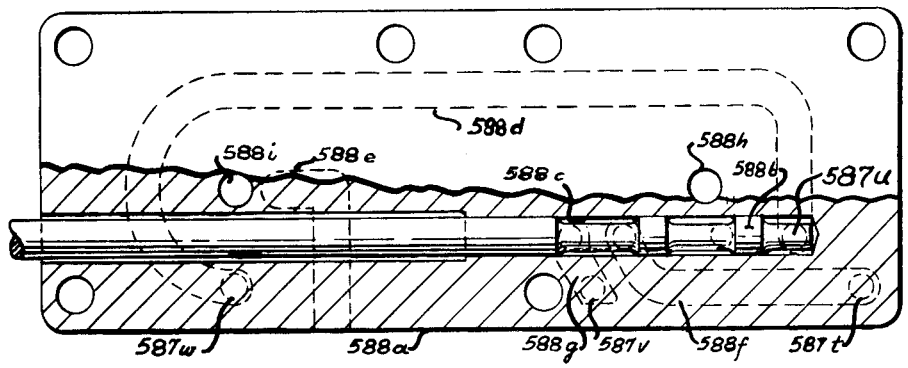
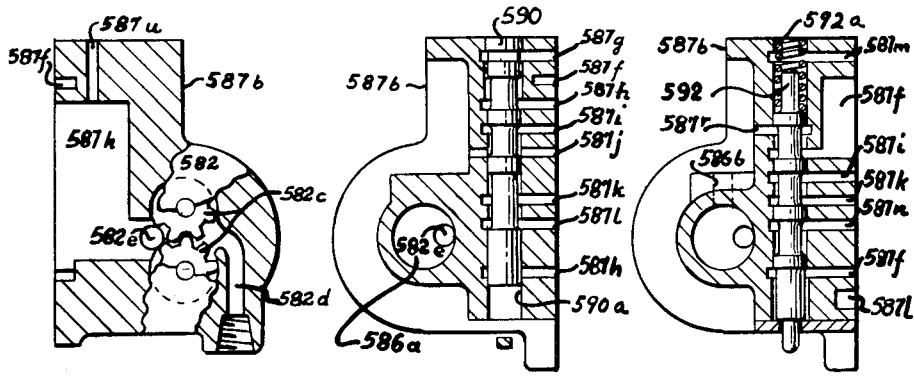
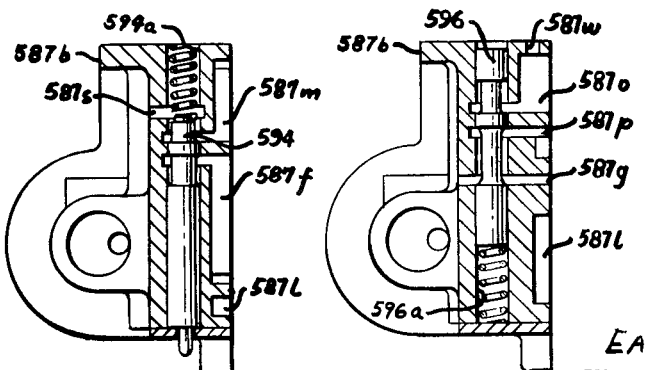
INVENTOR
EARL A THOMPSON
BY
ATTORNEY United States Patent Office 3,198,026
Patented Aug. 3, 1965

3,198,026
MECHANICO-HYDRAULIC POWER AND
CONTROL UNIT
Earl A. Thompson, 1300 Hilton Road, Ferndale, Mich.
Original application Jan. 8, 1958, Ser. No. 707,802, now
Patent No. 3,071,929, dated Jan. 8, 1963. Divided
and this application Mar. 12, 1962, Ser. No. 179,178
9 Claims. (Cl. 74—337.5)

This is a division of this inventor's co-pending application Serial No. 707,802, filed Jan. 8, 1958, for Mechanico-Hydraulic Power and Control Unit, the disclosure of which is incorporated herein by reference, now Patent No. 3,071,929 issued Jan. 8, 1963.

The invention of this divisional application relates to a hydraulic controlling and driving mechanism for operating movable machine elements in a predetermined program of motions. It is particularly but not exclusively suitable for operating such devices as machine tools, material handling equipment, assembly machines, testing, inspecting, sorting or packaging machines, and in fact any machinery where to and fro motions of machine elements require coordination of their timing, velocity, and acceleration patterns in repetitive cycles.

It is an object of the present invention to provide an improved mechanico-hydraulic drive and control system utilizing cams and hydraulic pulsators which is not only readily adaptable to a variety of machine motivation requirements with complete flexibility as to location as well as to program cycles, but which is also capable of very precise repetition of a predetermined program of movements.

Another object is to provide a system of this character which may be produced in a small number of standardized versions for adaptation to a wide variety of machinery motivation requirements.

Another object is to provide a device of this character where a number of hydraulic pulsator sections may be operated in coordination with one another from a central master cam means, and in which the cam means may be driven at more than one speed during a single cycle.

Another object is to provide a system of this character in which a rotary output shaft is automatically driven at one speed for a portion of each rotation and at another speed during another part of each rotation, the speed being changed in response to the angular position of the shaft itself.

Another object is to provide a system of this character wherein the cam means may be driven at more than one speed during a single cycle by means of a multi-speed gear box including self-controlling mechanism capable of independent functioning and thus adaptable to a wide variety of motivation problems.

Further objects and advantages of the present invention will be apparent from the following description, reference being had to the accompanying drawings wherein two forms of the present invention are illustrated.

In the drawings:

FIGURE 1 is an end view of a mechanico-hydraulic driving and control device incorporating one form of the present invention.

FIGURE 2 is a top view of the device shown in FIGURE 1.

FIGURE 3 is a sectional view of the gear box of the control mechanism of the machine as viewed along the lines 3—3 in FIGURE 1.

FIGURE 9 is a wiring diagram of the device shown in FIGURE 1.

FIGURE 10 is a mechanical and hydraulic diagram of the device shown in FIGURE 1.

FIGURE 11 is a diagram of a mechanico-hydraulic driving and control system embodying another form of the present invention.

FIGURE 13 is a horizontal sectional view of a cam case associated with the transmission of FIGURE 12.

FIGURE 15 is a view on line 15—15 of FIGURE 13.

FIGURE 20 is an end view, partly in section, of the cam case illustrated in FIGURE 13.

FIGURE 21 is a side view of the cam case.

FIGURE 22 is a detailed view, partly in section, along the line 22—22 of FIGURE 20.

FIGURE 23 is a sectional view along line 23—23 of FIGURE 22.

FIGURE 24 is a sectional diagram of a valve block forming part of the transmission of FIGURE 16.

FIGURE 25 is a view of the valve block looking at its mounting surface.

FIGURE 26 is a top view of the valve block shown in FIGURE 25.

FIGURE 27 is a view, partly in section, of a valve block cover plate.

FIGURE 28 is a sectional view along the line 28—28 of FIGURE 25.

FIGURE 29 is a sectional view along the line 29—29 of FIGURE 25.

FIGURE 30 is a sectional view along the line 30—30 of FIGURE 25.

FIGURE 31 is a sectional view along the line 31—31 of FIGURE 25.

FIGURE 32 is a sectional view along the line 32—32 of FIGURE 25.

In the form of the invention shown in FIGURES 1 through 12, there is provided a gear box 26, which in turn supports a cam box 28 at its front end and a motor 30 on its top face.

Figure 4:
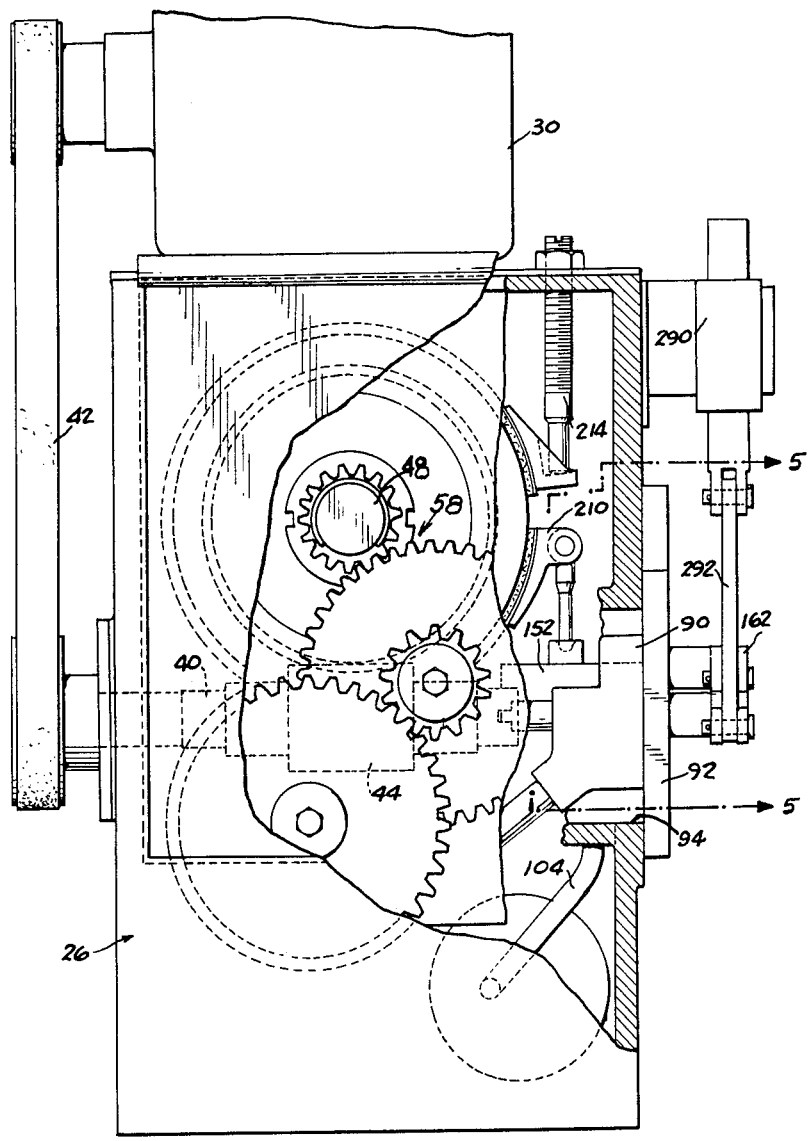
FIGURE 4 is a fragmentary part sectional view of the gear box shown in FIGURE 3 as viewed from the rear side of the machine, that is, from the top of FIG. 2.

Referring now to FIGURES 3 and 4, it will be noted that motor 30 drives a shaft 40 in gear box 26 through a belt 42. Shaft 40 is provided with a worm 44 which in turn meshes with a worm wheel 46 on a shaft 48 mounted in a bearing 50 within the gear box. A second shaft 52 mounted in bearings 54 and 56 is driven by shaft 48 through a reduction gearing 58. Shaft 52 in turn drives through gears 60 and 62 a gear 64. The hub 66 of gear 64 supports the driving member 68 of a feed clutch 70, and the hub 72 of worm wheel 46 supports the driving member 74 of a rapid traverse clutch 76. Hubs 66 and 72 are rotatably supported on shaft 78. The driven member 80 of clutch 70 is fixed on a disc 82, and the driven member 84 of clutch 76 is fixed to a disc 86. Discs 82 and 86 are keyed to shaft 78 as by Woodruff keys 88.

With this clutch arrangement, when clutch 76 is engaged, shaft 78 will have a relatively high speed of rotation corresponding to the speed of shaft 48. When clutch 76 is disengaged and clutch 70 is engaged, then the drive of shaft 78 will be effected through the gear train 58, shaft 52, gears 60, 62 and 64 and the shaft 78 will therefore be rotated at a much slower speed.

Figure 5:
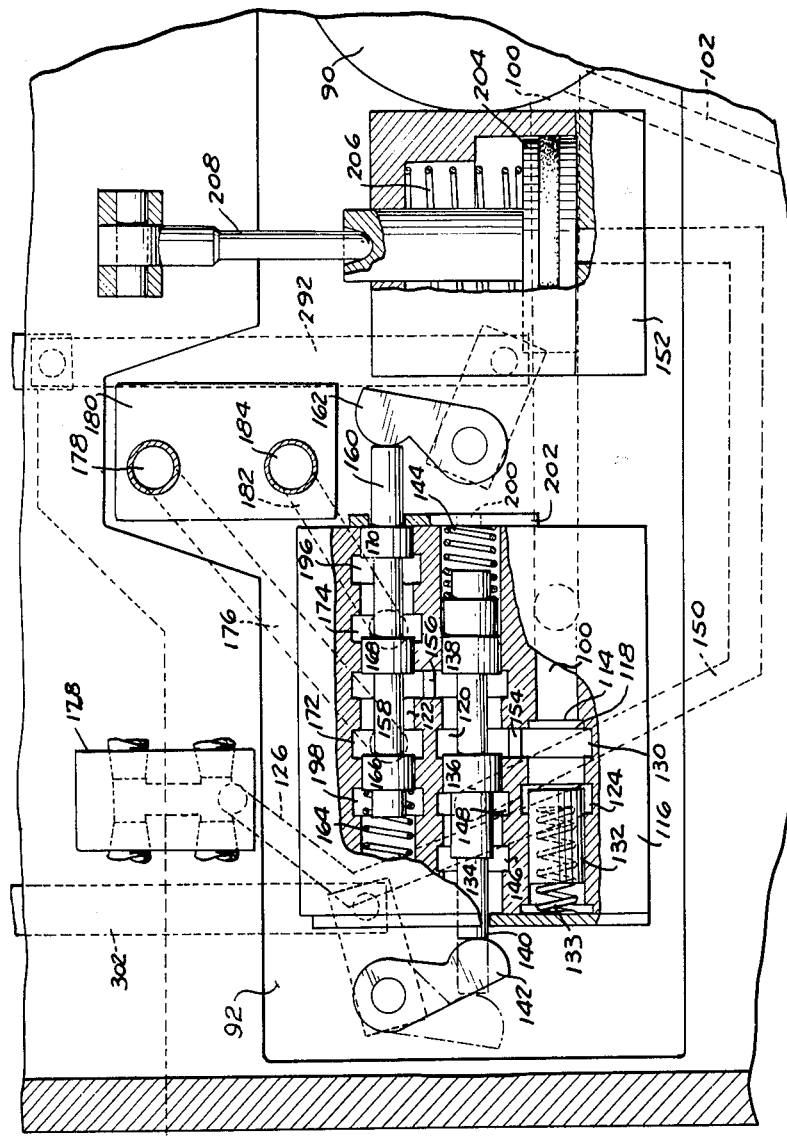
FIGURE 5 is a sectional view on an enlarged scale of a portion of the gear box as viewed along the lines 5—5 in FIGURE 4.

Clutches 70 and 76 are arranged to be actuated hydraulically, and this hydraulic mechanism will now be described:

Referring to FIGURES 3, 4 and 5, shaft 40 drives a pump 90 which is mounted on a cover plate 92 which closes the opening 94 at one side of gear box 26. The lower portion of gear box 26 forms an oil reservoir which is preferably filled with oil to about the level indicated by the dashed line in FIGURE 3. The intake of pump 90 is connected by a conduit 96 with a filter 98 at the bottom of the oil reservoir. The outlet of pump 90 communicates with a conduit 100 (FIGURE 5) which is formed in cover plate 92. A branch conduit 102 in cover plate 92 extends from the pump 90 to a conduit 104 (FIGURES 3 and 4) which connects with an accumulator 106 in the oil reservoir. Within the accumulator, there is arranged a piston 108 which divides the accumulator into an oil chamber 110 and an air chamber 112. A source of air under pressure is admitted to the air chamber 112; and as the oil pressure in chamber 110 builds up by reason of the operation of pump 90, piston 108 is moved to the left as shown in FIGURE 3.

The outlet conduit 100 from pump 90 communicates with an inlet port 114 of a valve block 116 (FIG. 5). Valve block 116 is supported on cover plate 92 and is provided with bores 118, 120 and 122. Bore 118 is fashioned with a groove 124 which communicates by way of a passageway 126 in cover plate 92 with a lubricating manifold 128. A second annular groove 130 in bore 118 communicates with bore 120 by way of a port 154. The spring biased piston 132 in bore 118 serves as a pressure regulator and thus closes port 154 until the pressure reaches a predetermined value determined by the design of spring 133. Within bore 120, there is arranged a valve member 134 which is fashioned with spools 136 and 138. One end 140 of valve member 134 projects outwardly of valve block 116 and is biased into engagement with a crank 142 by means of a spring 144 at the opposite end of valve member 134. Bore 120 is fashioned with an annular exhaust groove 146. Bore 120 is also formed with a second annular groove 148 which connects as by a passageway 150 in cover plate 92 with a brake cylinder 152 also mounted on cover plate 92. Bore 120 is further provided with an annular groove forming a port 154 between bores 120 and 118 and with an annular groove forming a port 156 between bores 120 and 122. Within bore 122, there is arranged a valve member 158 which extends out of valve block 116 at one end as at 160 into engagement with a crank 162. A spring 164 at the other end of valve member 158 biases the end 160 of the valve member into engagement with crank 162. Valve member 158 is formed with spools 166, 168 and 170. Bore 122 is fashioned with spaced apart annular grooves 172 and 174. Groove 172 connects as by a passageway 176 in cover plate 92 with a passageway 178 in a distributor sleeve 180 on shaft 78, and annular groove 174 in bore 122 connects as by a passageway 182 with a passageway 184 in distributor sleeve 180.

As will be seen in FIGURE 3, passageway 178 communicates with a chamber 186 formed in clutch member 82 in which a piston 188 is arranged. Passageway 184 in distributor sleeve 180 connects with a chamber 190 formed in clutch member 86 and in which a piston 192 is movable. When oil under pressure is admitted to chamber 190, clutch 76 is engaged to rotate shaft 78 at a rapid rate; and when oil under pressure is admitted to chamber 186, clutch 70 is engaged to rotate shaft 78 at a much slower rate. Pistons 188 and 192 are biased by springs 194 to normally exhaust oil from the respective chambers and thereby disengage the respective clutches. In FIGURE 3, clutch 70 is shown in the engaged position and clutch 76 in the disengaged position. Likewise, in FIGURE 5, valve members 134 and 158 are shown in the positions they occupy to produce the engagement of clutch 70 and the disengagement of clutch 76. Thus, with these valve members in the positions indicated in FIGURE 5, oil under pressure discharged from pump 90 is caused to flow into bore 118 through port 154 and into bore 120. Spools 136 and 138 on valve member 134 direct this oil under pressure to port 156 and into bore 122. Spools 166 and 168 direct this oil under pressure to annular groove 172 and thence through passageways 176 and 178 to the chamber 186 of clutch 70. At the same time, it will be observed that annular groove 174 communicates with an annular groove 196 which exhausts into the oil reservoir of the gear box. The other annular groove 198 in bore 122 which exhausts into the oil reservoir is blocked by spool 166. Thus, as oil is admitted to chamber 186 of clutch 70, piston 192 of clutch 76 moves under the influence of springs 194 to exhaust chamber 190 back through the valve block 116 and to the oil reservoir. If crank 162 is pivoted to the left as viewed in FIGURE 5, then spool 168 will seat on the land between annular groove 172 and port 156 and spool 170 will seat on the land between annular grooves 174 and 196. In this position, port 156 communicates with passageway 182 which leads to chamber 190 of clutch 76; and piston 188 will exhaust oil from chamber 186 back to the bore 122 through the annular groove 172 and then to exhaust through the annular groove 198.

If crank 142 is pivoted to the dotted line position shown in FIGURE 5, then valve member 134 will shift to the left under the influence of spring 144 to a position wherein spool 138 seats on the land between ports 154 and 156 and spool 136 seats on the land between grooves 146 and 148. In this position of valve member 134, the oil under pressure flowing through port 154 will be directed to the annular groove 148 and then through passageway 150 to the brake cylinder 152; and at the same time, the bore 122 will be opened to exhaust through port 156, bore 120 to the right of spool 138 and the exhaust port 200 in the end plate 202 on valve block 116.

Within brake cylinder 152, there is arranged a piston 204 which is biased by a spring 206 in a direction to exhaust oil from the cylinder. Piston 204 is arranged to actuate a push rod 208 which is pivotally connected to one end of a brake band 210, FIGURE 4. Brake band 210 wraps around the drum portion 212 of the driven member 84 of clutch 76. The opposite end of brake band 210 is held in an adjusted fixed position by a stud 214 (see FIGURE 4). Thus, with valve member 134 in the position illustrated in FIGURE 5, brake cylinder 152 connects with exhaust through passageway 150, annular groove 148 and annular groove 146. When valve member 134 is shifted to the left, then oil under pressure admitted to bore 120 through port 154 is directed to annular groove 148 and then through passageway 150 to the brake cylinder to apply the brake and thereby stop the rotation of shaft 78.

Accumulator 106 is provided so that the pump 90 can be of relatively small capacity. Under such circumstances, when either of the clutches is operated, the additional oil under pressure required to operate the clutches is supplied from the oil chamber 110 of the accumulator, which, by reason of the air pressure in chamber 112, serves as a reservoir for oil under pressure.

Figure 6:
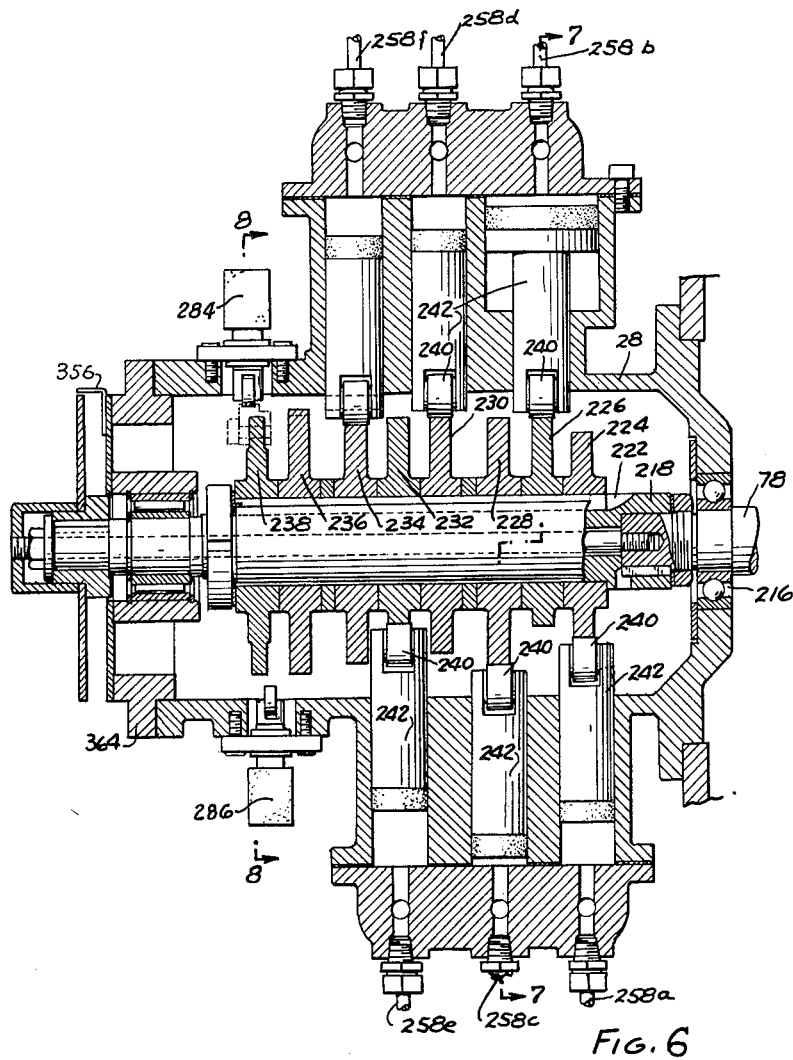
FIGURE 6 is a horizontal sectional view of the cam box as viewed along the lines 6—6 in FIGURE 3.

Referring now to FIGURE 6, it will be observed that the outer end of shaft 78 is journalled in a bearing 216 and has a keyed connection with one end of a hollow shaft 218 on cam box 28. The other end of shaft 218 is journalled in a bearing 220. Shaft 218 is formed with a keyway 222; and a series of cams 224, 226, 228, 230, 232, 234, 236 and 238 are keyed to rotate with this shaft. Cams 224 through 234 have cam followers associated therewith. These cam followers are in the form of rollers 240 and each is mounted on a piston 242.

Figure 7:
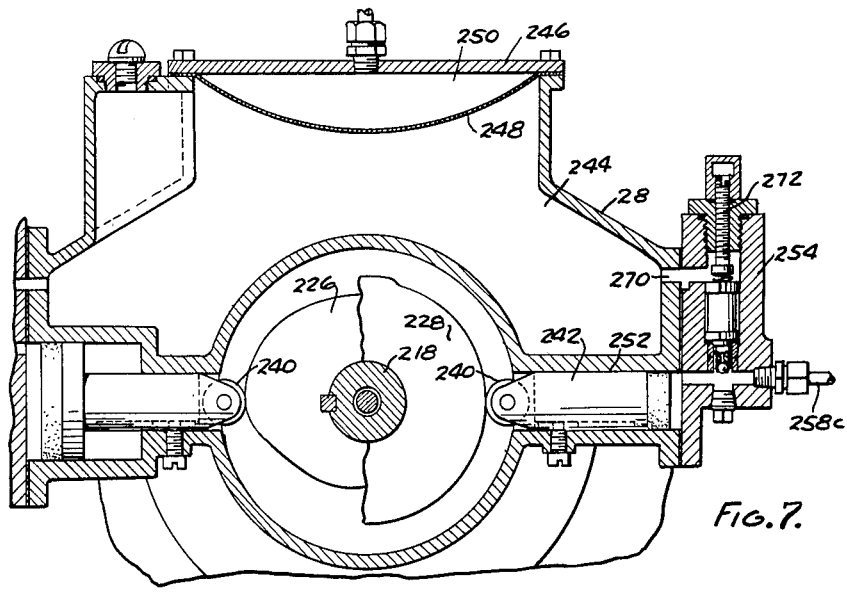
FIGURE 7 is a sectional view of the cam box as viewed along the lines 7—7 in FIGURE 6.

Referring more particularly to FIGURE 7 wherein the pistons associated with cams 228 and 226 are illustrated, it will be observed that the cam box 28 forms an oil reservoir 244. The top of the cam box is provided with a cover plate 246, and a diaphragm 248 is arranged adjacent the cover 246 so that air under pressure can be admitted to the space 250 above diaphragm 248 and thus maintain the oil in reservoir 244 under a predetermined relatively low pressure.

The pistons 242 and the valves associated therewith are constructed and operate substantially the same for each of the cams, and a description of one of these pistons will therefore suffice. Each piston 242 is slidably arranged within a cylinder 252 (FIG. 10). An oil conduit 258a, b, c, d, e, or f, as the case may be, is connected with the outlet end of each cylinder 252. Each of the conduits 258 extends to the cylinder of one of the components of the machine the operation of which is hydraulically controlled, for example 304, 354, 356. There is thus provided a liquid column confined within each respective cylinder 252, conduit 258, and actuating cylinder of a machine component.

Figure 8:
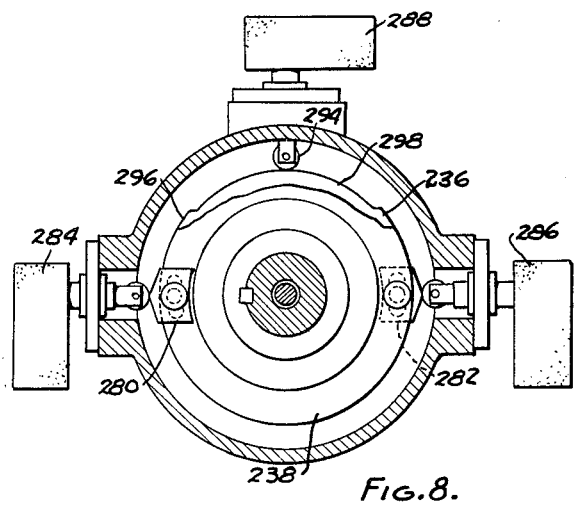
FIGURE 8 is a view similar to FIGURE 7 as viewed along the lines 8—8 in FIGURE 6.

As is shown in FIGURES 6 and 8, cams 236 and 238 are arranged to actuate electric switches. Cam 238 has a pair of abutments 280 and 282 mounted thereon which are arranged to actuate switches 284 and 286, respectively. Switches 284 and 286 are in the nature of safety switches which are actuated each cycle of the machine; and if one of the machine components such as a work piece loader is not functioning properly, these switches are arranged to stop the operation of the machine. Cam 236 actuates a switch 288 which in turn energizes a solenoid 290 mounted on the side of gear box 26 (FIGS. 1, 5). The functional connection between the two is indicated by the dash line connecting them in FIG. 12. The armature of solenoid 290 (FIGURE 2) connects with a link 292 (FIGURES 4 and 5) which is pivotally connected to crank 162. Thus, during the period of each cycle that solenoid 290 is energized by switch 288, valve member 158 (FIG. 5) is shifted to the left so as to energize high speed clutch 76 and cause the shaft 78 and the cams on shaft 218 to rotate at the more rapid speed.

In the particular arrangement shown in FIG. 8, switch 288 is actuated when the follower 294 rides over the high side 296 of cam 236; and when the follower 294 engages the low side 298 of cam 236, solenoid 290 is de-energized and spring 164 shifts valve member 158 to the position shown in FIGURE 5 so as to energize clutch 70 and de-energize clutch 76 and thus rotate shaft 78 and the cams on shaft 218 at a relatively slow speed. A second solenoid 300 mounted at the side of gear box 26 has its armature connected to a link 302 which is in turn pivotally connected with the crank 142 (FIGURE 5) that actuates valve member 134. Solenoid 300 is energized through a manually actuated swich described hereinafter.

As mentioned previously, the conduits 258 each extend to the cylinder of one of the machine components that is hydraulically actuated. One of these conduits, namely, conduit 258b, connects with a cylinder 304 (FIGURE 10).

Figure 12:
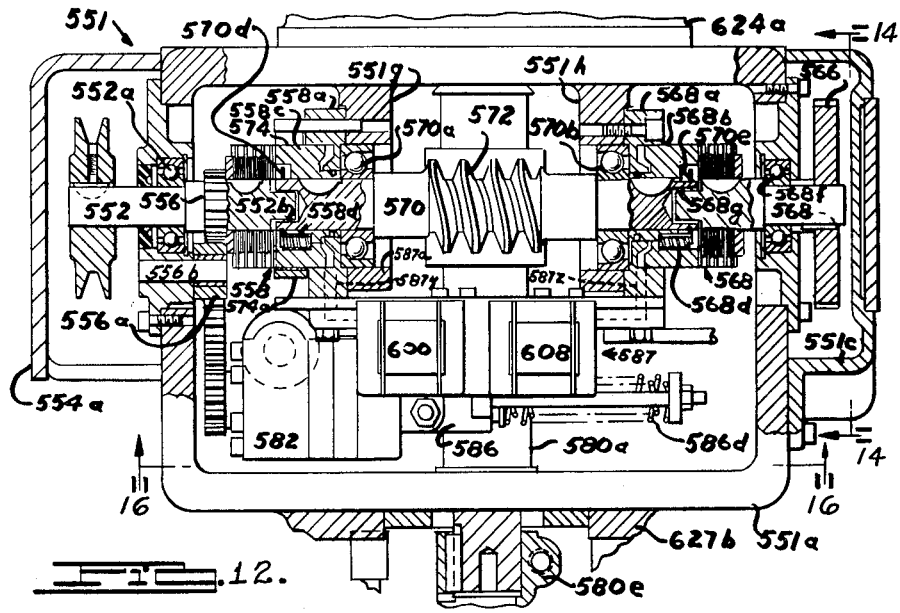
FIGURE 12 is a horizontal sectional view of a two-speed transmission forming part of the device diagrammed in FIGURE 11.

Slidably mounted in cylinder 304 is a piston 340, which may be connected by means of a stud 334 with a table, slide, or carriage 24 of a machine tool or other device. Also pivoted to the stud 324 is a piston 342 slidable in a stationary cylinder 344. The inlet port 350 of cylinder 344 is connected by a conduit with a plenary volume liquid pressure source such as an accumulator 321. The several circles marked "RO" in FIGURE 12 are intended to designate, preferably, a single accumulator and a manifold which connects all of the cylinder ends together to the common liquid pressure source. This may be a pressure vessel containing oil or other power transmitting liquid maintained under a high pressure by a body of compressed air or other gas. Such a device forms a convenient source of a plenary volume of liquid under pressure and which is available for utilization as required, although it will be understood that other sources, such as spring or weight-loaded accumulators, constant volume pumps with pressure relief valves, or variable volume pumps with pressure responsive volume regulators may be utilized, and the term plenary volume liquid pressure source is intended to include all such devices.

It will be appreciated that the various components that are controlled by the cams on shaft 218 can be operated at a desired rate by designing the shape of the particular cam so as to produce the rate of movement desired as more fully disclosed in my patent referred to. At the same time, the operation of the various components can be timed relative to one another by the relative positions of the sams on shaft 218. As an example, the cam 226 that may be employed for controlling the rate of movement on table 24. Let us assume that when the cam follower on the piston 242 engages the cam 226 at a low point, the table is positioned against the front stop 330. As the cam rotates, the cam follower travels relatively around the periphery of the cam to a higher point. During this movement, the cam 236 (FIGURE 10) which actuates the fast and slow speed switch 288 is designed to maintain the solenoid 290 energized. In other words, the follower 294 rides on the high side 296 of cam 236; and the shaft 218, together with the cams, rotates relatively rapidly, because the crank 162 (FIGURE 5) positions the valve member 158 in the valve block 116 so as to direct oil under pressure to the rapid traverse clutch 76. During this interval of time, the piston 242 actuated by cam 226 moves outwardly and feeds oil under pressure to the cylinder 304 on the table feed mechanism. The oil is displaced into cylinder 304 at a rate corresponding to the travel of the piston 242 as controlled by the rate of rise on the periphery of the cam 226. Thus, with the cam illustrated, the table would be advanced first with an accelerated movement; and the rate of acceleration decreases as the cam follower approaches said higher point on cam 226. At this time, the cam follower 294 associated with cam 236 rides onto the low side 298 of cam 236 and solenoid 290 is thereby de-energized. This causes feed clutch 70 to engage, and the piston 192 of clutch 76 moves under the influence of spring 194 to direct the oil therein to exhaust. Thus, at this points, shaft 218 and the cams thereon rotate at a relatively slow feed rate; and the piston associated with cam 226 continues to move outwardly at a more or less constant rate as determined by the cam. At a still higher point on the cam the table 24 is positioned against a rear stop 332. At the highest point on cam 226, the piston has moved outwardly the maximum amount and the cam follower then begins to ride down the low side of the cam. At this point on cam 226, the cam follower 294 associated with cam 236 is arranged to ride up to the high side 296 of cam 236, thereby actuating the switch 288 energizing solenoid and causing rapid traverse clutch 76 to engage and feed clutch 70 to disengage. Thus, the cams on shaft 218 are caused to rotate at a more rapid rate. As the cam follower starts to ride down the decline on cam 226, the oil pressure of accumulator 321 acting in cylinder 344 causes piston 342 (FIGURE 10) to move to the right; and the table 24 thus travels on its return stroke towards the starting position.

During the return movement of the table, piston 340 in cylinder 304 discharges oil back into the line 258b and thus causes the cam follower associated with cam 226 to ride around the periphery of the cam.

The piston 242, operated by cam 224, connects by conduit 258a with another machine tool operating cylinder, such as shown at 354 in FIGURE 10. This may have a piston 356, the rod 358 of which serves to operate the machine element, such, for example, as a work ejector 359 in a hydraulically operated spindle and collet assembly. The piston 242, operated by cam 228, connects by a liquid column line 258c with the cylinder 360. The latter has a piston 362 having a hollow end 364 which may serve to operate a third machine element, for example a spindle collet 365. The opposite ends of cylinders 354 and 360 are connected to the plenary volume source of pressure liquid, indicated at "RO" as previously described.

In FIGURE 9, a suitable wiring circuit for the machine is illustrated. A normally closed stop switch 494 and a normally open start switch 496 are connected in series across the line 498 through a solenoid 500 of a relay 502. Relay 502 is in the nature of a circuit holding relay and at the same time when energized closes switches 504 and 506. Switch 504 is the holding circuit for relay solenoid 500 and switch 506 may control motor 30. A cycle start and a cycle stop switch 508 and 510 are also connected in series across the line 498 through the relay switch 512, the holding contacts 504 of relay 502 and switch 494. The solenoid 514 of relay 512 is connected across the line 498 in series with the normally open start switch 508. Solenoid 290 which controls the operation of clutches 70 and 76 is connected across the line in series with switch 288, stop switch 510, the holding circuit of relay 502 and stop switch 494. Relay 300 which controls the actuation of the brake on shaft 78 is connected across the line in series with cycle stop switch 510, a holding circuit of relay 502 and stop switch 494. The safety circuit generally designated 516, in which are connected switches 284 and 286 which are energized by abutments 280 and 282 on cam 238, controls a relay 518 which is adapted to break the circuit through brake solenoid 300 in response to improper functioning. This circuit extends from brake solenoid 300 through cycle stop switch 510, relay 518, relay 512, holding circuit 504, and stop switch 494. Thus, when the motor starting switch 496 is momentarily closed, the transmission motor 30 is energized. Upon depression of cycle starting switch 508, the brake on shaft 78 is released and the cycle of operation is started. If it is desired to stop the cycle at any point, it is only necessary to momentarily depress cycle stop switch 510 to apply the brake and thereby stop the rotation of cam shaft 218.

The initiation and the termination of each operation is controlled by the positioning of the corresponding cam on the shaft 218 relative to the other cams. In addition, the rate at which the operation is performed throughout various portions of the cycle is controlled by the design of the cam. Thus, as pointed out above, if it is desired to have the table move with a harmonic motion to the start of the feed cycle and from the end of the feed cycle back to the starting position, then the cam 226 is designed to produce this harmonic motion. Obviously, the other operations described can be similarly controlled. Furthermore, it will be noted that the range of movement of the table and of the other machine elements is very accurately controlled between front and back stops.

After the machine is once set in operation as by closing of the starting switch 496, it continues to operate automatically, one complete cycle of operation being performed during each revolution of the cam shaft 218.

When the table reaches the end of its work stroke, switch 288 is again actuated to release clutch 70 and engage the rapid traverse clutch 76. The table is then returned to the starting position by means of the pressure in accumulator 321, but the rate at which the table is returned is controlled by the shape of the cam 226. At this point, cams 228 and 224 may operate so that the collet is expanded and the work piece ejected. If it is desired to stop the operation of the machine at any instant during its cycle of operation, the cycle stop switch 510 is manually actuated to de-energize solenoid 300 and thus apply an instant braking effect to the shaft 78 to which the cam shaft 218 is secured.

In the form of the invention illustrated in FIGURES 11 et seq., the mechanico-hydraulic driving and control unit includes a self-controlled two-speed transmission 551 shown diagrammatically in the left-hand half of FIGURE 11, and a program cam and motion transmitting system 627 shown generally in the right-hand half of FIGURE 11. The transmission may be driven from a suitable rotary source of power, such as the electric motor 550. The motor drives the input shaft 552 of the transmission through a belt drive 554. The input shaft 552 drives a pinion 556 and also the input member of a hydraulically engaged, spring released clutch 558. Pinion 556 drives a gear 560 secured to a countershaft 562 which carries a pinion 564 at its opposite end. Pinion 564 drives a gear 566 and therewith constitutes a set of speed change gears. Gear 566 drives the input member of a second hydraulically engaged, spring-released clutch 568. The driven members of the clutches 558 and 568 are secured to the opposite ends of a shaft 570, having a worm 572 thereon and a brake drum 574. The latter has a spring biased, hydraulic motor 576 for engaging the brake. The worm 572 drives a worm wheel 578 secured to the camshaft 580.

For the purpose of automatically controlling the starting, stopping, and speed of the transmission, there is provided a control assembly 587 comprising a hydraulic control pump 582 driven from the gear 566 and which may circulate a body of oil contained in the transmission housing for control, lubricating and auxiliary power purposes. The pump 582 may deliver to a combined accumulator and relief valve 586 comprising a spring-loaded piston and spillover port, and also supplies oil to a bank of control valves 588, 590, 592, 594 and 596. In the diagram the valves 588, 592, 594, and 596 are shown as two-position valves and the valve 590 as a three-position valve, all of which have a normal position in which the connections shown in the cross-hatched rectangles are established. Single-headed arrows are used to indicate flow at reservoir pressure and double-headed arrows to indicate flow at pump delivery pressure. Each of the valves, when shifted, establishes the connections shown in one of the unhatched rectangles. Valve 588 may be manually operated. Valve 590 is biased to its normal position by fluid pressure from the accumulator in the rod end of a differential cylinder 598.

The valve 590 may be shifted to its mid-position by a solenoid 600 and may be shifted to its extreme position by the admission of pressure fluid from the accumulator to the head end of cylinder 598 under the control of valve 588. Valve 592 is spring biased to normal position and may be shifted to its other position by an adjustable cam 602 on the cam shaft 580. Valve 592 also has a hydraulic holding cylinder 604 which holds the valve in its shifted position until it is released by the shifting of valve 594. Valve 594 is spring biased to normal position and may be shifted by an adjustable cam 606 on camshaft 580. Valve 596 is also spring biased to its normal position and may be shifted by a solenoid 608.

Valve 588, in its normal position, exhausts the head end of cylinder 598 and also connects the brake cylinder 576 with either pressure or exhaust depending upon whether valve 590 is in its normal or intermediate position respectively. In its shifted position valve 588 admits pressure fluid to the head end of cylinder 598 for the purpose of shifting valve 590 to its extreme position and also connects the brake cylinder 576 directly to exhaust independently of valve 590. The valve 588 and the extreme position of valve 590 are provided for the purpose of manually releasing the brake 576 and engaging the low speed clutch 568 so that camshaft 580 will turn at its slow speed under manual control for "inching" purposes and the like, and it will be understood that this is an accessory feature which may optionally be omitted if desired.

Valve 590, in the position shown, delivers pressure fluid to cylinder 576 for engaging the brake and also exhausts fluid from the low speed clutch 568. When shifted to its intermediate position by solenoid 600, the valve 590 exhausts cylinder 576 to release the brake and supplies pressure fluid to engage the low speed clutch 568, subject, however, to a conjoint control by the valve 592.

Valve 592, in its normal position, exhausts fluid to release the high speed clutch 558 and places the low speed clutch 568 under the control of valve 590. In its shifted position, valve 592, provided valve 590 has been shifted, delivers pressure fluid to engage high speed clutch 558 and exhausts fluid to release low speed clutch 568. As previously explained, the valve 594 is merely a reset valve for by-passing the holding cylinder 604 to permit valve 592 to return to its spring biased, normal position.

Thus, operation of the control assembly 587 is such that energization of solenoid 600 will start the camshaft 580 rotating at slow speed. Thereafter, the cam 602 will shift the transmission to drive the cam shaft at high speed, and still later the cam 606 will again shift the transmission to low speed. So long as the solenoid 600 remains energized, camshaft 580 will continue to rotate, first at a slow speed and then at a high speed during each revolution, controlling its own speed by operation of the cams 602 and 606.

The valve 596 forms an auxiliary valve independently of the other four which may be utilized optionally for various purposes, particularly when it is desired to operate a movable element in the system during an interval when the camshaft 580 is stationary. Thus, the valve 596 controls a motor line 610 and in normal position exhausts the same. When solenoid 608 is energized to shift valve 596, the motor line 610 is connected to accumulator pressure.

For the purpose of controlling the drive motor 550 and the solenoids 600 and 608, there is provided an electric control circuit connected between a pair of electric supply lines designated L–1 and L–2. The circuit may include a master relay 612 of the holding type, having a manual master start switch 614 and a manual master stop switch 616. When energized, the relay 612 controls the motor 550 and also a cycle control relay 618 of the holding type, having a manual cycle start switch 620 and a manual cycle stop switch 622. In addition, the master relay 612 controls the supply of current to the solenoid 608 through the normally closed contacts of a cam switch 624 on the camshaft 580 and through a manual or other switch 626.

The normally open contacts of relay 618, which are of the make-before-break type, control energization of the cycle solenoid 600 directly. The normally closed contacts of relay 618 also control solenoid 600 but are in series with the normally open contacts of cam switch 624, which are arranged to be open whenever the camshaft reaches a predetermined point in its rotation. The arrangement is such that when the cycle stop switch 622 is operated at any point in the rotation of camshaft 580, relay 618 will be deenergized, but solenoid 600 will remain energized until the cam switch 624 opens at the predetermined stopping point. Operation of the master stop switch 616, however, will de-energize solenoid 600 immediately regardless of the point in the cycle and will also de-energize motor 550.

It will thus be seen that the self-controlled two-speed transmission 587 serves, whenever the cycle start switch 620 has been operated, to energize solenoid 600, shifting valve 590 to its intermediate position which releases brake 576 and engages low speed clutch 568 to cause the camshaft 580 to be driven at slow speed from motor 550 through the gearing 556, 560, 564, 566, 572, and 578. At the pre-selected point in each revolution of camshaft 580, cam 602 will shift valve 592 to disengage the low speed clutch 568 and engage the high speed clutch 558 whereby the camshaft will be driven at a high speed through reduction gearing 572–578, only. At another pre-selected point in each revolution of the camshaft 580, the cam 606 will trip the reset valve 594, thus disengaging the high speed clutch 558 and re-engaging the low speed clutch 568 to continue the rotation of the camshaft at slow speed. These cycles of fast and slow rotation of the cam shaft 580 will repeat each revolution until the cycle stop switch 622 is operated, which brings the camshaft 580 to a stop at the predetermined stopping point. At this point, cam switch 624 also enables the solenoid 608 to be energized by the switch 626 for the purpose of supplying accumulator pressure fluid to the motor line 610 for auxiliary power purposes.

The camshaft 580 drives a programming and motion transfer device 627 comprising a number of cam operated hydraulic pulsator sections, designated by subscripts $a$ through $i$, inclusive. Each section may comprise a cam 628 which has a contour shaped to provide the desired acceleration, velocity, deceleration, and dwells for any particular movable machine element which is to be actuated. Each cam 628 has a follower 630 mechanically connected to an expansible chamber device such as the transmitting piston and cylinder 632. Each transmitter unit 632 has a balance valve assembly 634 which may also constitute the cylinder head and which contains a spring-loaded relief valve opening out of the chamber and a replenishing check valve opening into the chamber. Each balance valve is connected with a replenishing reservoir 636 which is preferably maintained at a slight super-atmospheric pressure as, for example, by connection to regulated compressed air supply source 638.

Each expansible chamber 632 constitutes the pulse transmitter of a liquid column type motion transfer device, including a closed liquid column conduit 640 which is connected to a pulse receiver in the form of a hydraulic motor connected to actuate the movable machine element or slide which is to be motivated by the particular cam-pulsator section concerned.

Such receiver motors may take any of a variety of forms, some of which are illustrated in FIGURE 11. Thus, the sections $a$, $b$, and $c$ may be utilized for operating a two-pressure receiver motor for pressing, clamping and the like and comprising a principal cylinder 642 and an intensifier cylinder 644. The motor 642 may have a piston and rod 646 which are operated through a normal substantially full stroke by the combined displacement of transmitter units 628b and 628c. The liquid column line 640bc connects with the head end of cylinder 642 through a port in the side wall of a reduced diameter cylinder 647 in which an intensifier plunger 648 is slidable to close off the liquid line 640 and to intensify the pressure in the head end of cylinder 642. For this purpose the intensifier cylinder 644 has a large diameter piston 650 which operates the plunger 648 in accordance with displacements of the transmitter 632a.

The rod ends of both cylinders 642 and 644 are connected with a supply of return oil marked "RO" in FIGURE 11 for diagrammatic purposes. It will be understood that the return oil supply may be constituted by either separate sources or a common source which can supply a plenary volume of fluid under high pressure. It is preferred to connect the return end of all cylinders together so as to allow for transferring motion from an advancing cam to another cam which is receding whenever possible. It is preferred to utilize a gas loaded liquid accumulator as the plenary volume high pressure source, although it will be understood that other sources such as spring or weight loaded accumulators, variable displacement pumps with pressure compensation, or fixed displacement pumps with relief valves may be utilized.

In FIGURE 11 there is illustrated a gas loaded accumulator 652 comprising a container having a connection with a regulated source of compressed air 654 and containing a body of oil or other power transmitting liquid 656. An outlet pipe 658 has a downwardly, opening, flared, entrance horn 660 for the purpose of assuring the intake of air free oil. The outlet 658 connects with a return oil manifold 662 which connects by branch conduits, not illustrated, with the return ends of cylinders 642 and 644 and with any other points in the system where a constantly acting fluid pressure bias is required.

The cam-pulsator section $d$ is utilized for operating a hydraulic motor 664, having a piston 666 provided with a rack for operating an oscillatory pinion 668. The motor 664 may be provided with an auxiliary operator for the purpose of enabling the pinion 668 to be driven when camshaft 580 is stationary. For this purpose an auxiliary piston 670 is provided at the left end of motor 664 and has its head exposed to the pressure in the auxiliary motor line 610. The right end of the motor 664 may be connected to the return oil manifold 662, as indicated at "RO."

The cam-pulsator sections $e$ and $g$ are illustrated as forming a double-acting motivation system for a rectilinear fluid motor 672 having a piston 674 therein provided with rods on both ends. Likewise, the cam-pulsator sections $f$ and $h$ are connected to opposite ends of a balanced piston hydraulic motor 676, having a piston 678 provided with a rack for driving a pinion 680. The cam-pulsator section $i$ is connected with a dual hydraulic motor 682, the pistons 684 of which have racks engaged with a pinion 686. The right-hand end of the uppermost cylinder of motor 682 is connected with the return oil manifold 662, as shown at "RO."

Each of the fluid motors operates between limit stops which are so arranged that the total displacement of each fluid motor is slightly less than the displacement of the corresponding transmitter unit 632. These stops may be formed as separate, adjustable screw stops, or merely as the normal interior end surfaces of the cylinders within which their pistons operate. It will be seen that each of the cams 628 may be contoured to provide for the desired motion of the particular machine element controlled by the respective cam and for the proper time sequence of such motions with the motions of the other cams so that during a single revolution of the camshaft 580 all of the machine elements partake of the forward and return motion which they are required to perform.

With respect to the single-acting motors 642, 644, 664, and 682, the advancing movement is governed by the rising part of the contour of cam 628 and this is transmitted through the liquid column line 640 to the corresponding motor. Due to the slight excess displacement in the transmitter chamber 632, the final part of the rise will be ineffective to operate the motor because the latter will have already reached the limit of its stroke, accordingly, a small amount of fluid will be displaced to the reservoir 636 through the relief valve built into the cylinder head 634.

As the falling part of each cam 628 comes under the follower 630, the return oil pressure maintains a continual bias transmitted through the motor piston to the liquid column 640 and transmitter chamber 632 so as to maintain the follower 630 in engagement with the falling part of the cam. The final part of the cam fall, however, will take place without this return oil bias on the system because the motor piston will have reached the limit of its stroke. During this final fall, the make-up oil in the reservoir 636 will enter the transmitter unit 632 through the replenishing check valve built into the cylinder head 634, thus, returning to the liquid column the quantity of oil displaced through the relief valve at the end of the advance stroke and also making up for any possible loss of fluid through leakage.

The contours of the cams 628$e$ and 628$g$, whose transmitters 672 for double-acting drive, will have their contours of substantially complementary form so that when one is rising, the other is falling at a corresponding rate. However, the time phasing of the two cams may be offset somewhat and the relief valve pressure settings may be correlated so as to assure proper pop-off and make-up from and to the liquid column line 640. Thus, cam 628$g$ may be set on the shaft 580 a few degrees in advance of cam 628$e$ so far as their respective rises and falls are concerned. On the other hand, the cam 628$g$ may be positioned so as to lag the cam 628$e$. In either case, the relief valve for the liquid column 640$e$ will be set at a higher pressure than that for the column 640$g$.

The double-acting fluid motor 676 is also connected for double-acting drive from cams 628$f$ and 628$h$. These, for example, may have correlated rise and fall portions such that when one cam follower is rising at a predetermined rate, the other cam follower will be falling at a slightly different rate. Thus, on the left-hand stroke of piston 678 cam 628$f$ may fall somewhat faster than cam 628$h$ rises, thereby assuring that the liquid column 640$f$ is being replenished all during the left-hand stroke, and thus, the full pressure up to the setting of the relief valve for liquid column 640$h$ is available to push piston 678 to the left. Operation of the motors 672 and 676, on their return strokes, is effected in a similar manner and the relationship between the rise of one cam and the fall of another may be arranged in a similar manner to that just described.

It will be understood that each of the liquid column lines 640 and the associated expansible chambers of the transmitter and fluid motor will be maintained filled with solid oil or other power transmitting liquid. For this purpose suitable air bleed valves, not illustrated, are installed at all high points within the closed liquid columns. Thus, with the contours of all of the cams 628 properly chosen, the two-speed transmission will drive the camshaft 580 to produce the predetermined program of motions of the various fluid motors in coordinated sequence and with the accelerations and velocities desired. Normally, the slow speed part of the camshaft revolution is utilized for machine motions which require slow feeds and heavy forces, such, for example, as drilling, milling, turning, pressing or other machining operations, while the high speed portion of the camshaft revolution will be utilized to perform accessory operations, such as the chucking and unchucking work pieces and operating work handling mechanisms for automatically feeding pieces in and out of a machine.

Where alternate operation cycles are required occasionally, such motions may be effected by auxiliary power supplied through motor line 610 under the control of valve 596. Thus, it will be seen that pinion 668 may be operated alternatively by the piston 670 when pressure is admitted to shift it and the piston 666 to the right. When the pressure is relieved, then return oil pressure in the right-hand end of motor 664 will push both pistons 666 and 670 back to the left.

Referring now to FIGURES 12 et seq., the mechanico-hydraulic drive and control system, which has just been described in outline is illustrated in detail. The two-speed transmission 551, FIGURES 12 and 16 through 19, includes a housing 551$a$ having a cover 551$b$ at the top and a change gear cover 551$c$ at the side. A suitable filler plug 551$d$, an oil level sight glass 551$e$, and a drain plug 551$f$ may be provided. A belt enclosure 554$a$ is secured to the side of the housing and the cover carries a pivoted motor bracket 550 of usual form overlying the transmission.

Projecting from an inside vertical wall of the casing 551$a$ are a pair of vertical bearing brackets 551$g$ and 551$h$, which support the shaft 570 on bearings 570$a$ and 570$b$. The bracket 551$g$ also supports the body 558$a$ for the operating cylinder of the high speed clutch 558. A clutch actuating piston 558$c$ is rotatable and slidable in the body 558a and slidably keyed to the shaft 570. Return springs 558d react between a snap ring 570d and piston 558c. The piston 558c at its left-hand end in FIGURE 12 is slotted to receive the tabs of the driven clutch plates and in its mid-portion forms the drum 574 to be engaged by the brake band 574a. The input shaft 552 is journaled in bearings 552a and is piloted at 552b in a bearing in the end of shaft 570. Shaft 552 carries pinion 556 which drives gear 560 through an idler pinion 556a journaled on a stub shaft 556b. The driving plates of clutch 558 are slidably keyed to shaft 552.

The bracket 551h similarly supports the body 568a for the operating cylinder of clutch 568. A piston 568b is rotatable and slidable in the body 568a and has slots receiving the tabs of the driven plates of clutch 568 as well as being slidably keyed to the right-hand end of shaft 570. Similar return springs 568d react against snap ring 570e.

The driving plates of the clutch 568 are slidably keyed to a stub shaft 568c which is journaled in bearings 568b of the housing and in a pilot bearing 568g in the end of shaft 570.

Figure 18:
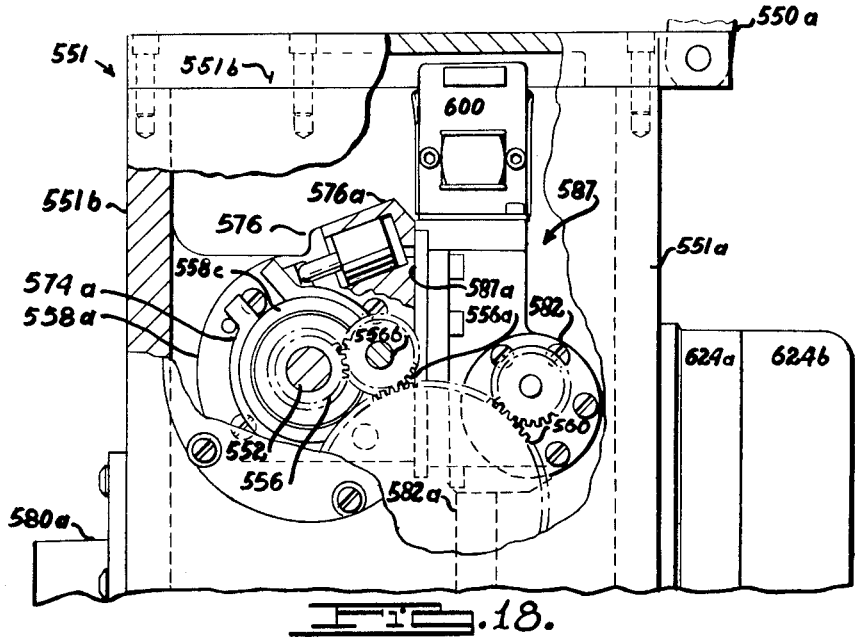
FIGURE 18 is a left end view, partly broken away, showing the mechanism of FIGURE 16.

The control assembly 587 has a flat, vertical face 587a which bolts against corresponding flat surfaces formed on the clutch cylinder bodies 558a and 568a and on the hydraulic brake motor 576a, FIGURE 18. This mounting forms a fluid tight seal so that certain fluid connections between the clutch and brake cylinders and the valve bodies are thereby established. In addition, the control assembly 587 also includes the pump 582 and the accumlator 586, as well as the solenoids 600 and 608, secured to the top part of the valve body. Thus, the entire set of control valves, along with their associated pump, accumulator, and control solenoids, constitutes a self-contained sub-assembly 587 which may be readily removed and replaced as a unit.

The countershaft 562 is journaled in the housing on bearings 562a and 562b and the pinion 564 drives the gear 566 through a compound gear and pinion 564a and 564b journaled on a stub shaft 564c. The pump 582 has an inlet drop pipe 582a provided with a suction filter 582b near the bottom of the housing 551a. An opening 551i provides free connection between the casings 551a and 551c.

The main camshaft 580 is formed in two sections, section 580a being journaled on bearings 580b in the transmission housing 551a and having similar ends each projecting out of the housing 551a and carrying a keyway for driving either the other section of the camshaft or the electrical cam mechanism. The transmission 551 is arranged for selective assembly with the main cam box either on the right or the left of the transmission, as viewed in FIGURE 17. The shaft 580a carries keyed thereto a cam collar 580c upon which the adjustable cams 602 and 606 are adjustably mounted by screws 602a and 606a. For this purpose the collar 580c may be provided with a number of screw holes around its circumference and each of the cams 602 and 606 may be provided with a slot for receiving the screw so as to permit circumferential adjustment of the respective cams.

The cam-pulsator unit 627 includes a housing block 627a having an end wall 627b adapted to bolt to the side of the transmission housing to enclose the projecting end of the camshaft section 580a. At its opposite end, the housing 627a is provided wtih a bearing plate 627c having a bearing 627d which journals the second section 580d of the camshaft 580. At its opposite end, the section 580d is formed with a split and keyed socket 580e which is keyed to the end of shaft section 580a and clamped by means of a clamping screw 580f. Access to the clamping screw may be had through a removable filtered breather plug 627i.

The housing block 627a is formed with a longitudinal tubular section which encloses the camshaft section 580d and the cams 628 carried thereon. Each of the cams engages a longitudinal key 580g and is spaced from the adjacent cams by a spacer tube 580h. The stack of cams and spacer tubes, along with the inner race of bearing 627d, are clamped on the shaft 580d by a nut 580i. A sealing disc 580j and a calibrated index dial 580k are secured to the end of the shaft 580d by a screw 580l.

Opening horizontally out of each side of the housing block 627a are a plurality of cylinder bores 627f, each of which is provided with a removable liner. The liners for the cylinders 627f may be provided with various internal diameters for interchangeable use to provide for changing the displacements of the cylinders as required for various applications. Each of the cylinder bores terminates in a flat surface on the side of the housing block 627a and receives its individual cylinder head 634 secured thereto. Each unit 634 forms a closure for the end of the cylinder, a connection terminal for the liquid column line, a mounting for the balance valve, and a connection to the replenishing reservoir. As shown in FIGURE 20, the liquid column connection is formed in the bottom at 634j. The balance valve assembly is mounted in a vertical bore as shown at 634k and the connection to the reservoir 636 is shown by the passage 634l formed partly in the cylinder head 634 and partly in the housing block 627a.

The replenishing reservoir 636 is preferably formed integrally with the upper part of the housing 627a and includes a cover plate 627g and an oil level sight glass 627h. Suitable filler and drain plugs, not shown, are provided. The cylinder head 634 is also provided with an air bleed valve 634m at the high point in the internal cavity of the cylinder head.

Each of the cylinder bores 627f supports within its liner a piston 632j which has a spherical outer surface at 632k and a packing cup 632l. A piston rod 632m is rigidly secured to the piston and is bifurcated at its opposite end to embrace a follower roller 632n journaled on needle bearings on a wrist pin 632o. The wrist pin is preferably clamped in the ends of the connecting rod and projects outwardly therefrom to form trunnions for the bifurcated ends of a swinging radius arm 632p. Each of the arms 632p is journaled on one of two longitudinal rocker shafts 632q which are carried in upstanding integral ears 632r formed in the lower portion of the housing block 627a. The piston and radius arm assembly, shown in FIGURE 22, carries a large piston 632j, while that shown in FIGURE 23 carries a smaller one for engagement with a smaller bore liner.

The valve block 587b of the control assembly 587 is shown in FIGURES 25 and 26 and has formed therein a plurality of vertically extending valve bores 590a, 592a, 594a, and 596a, as well as a horizontally extending accumulator bore 586a, having a vertically opening branch port 586b. A laterally extending boss 587c provides a support for the pump 582.

Secured to the vertical face of the body 587b is a subplate 587d which has upon it the mounting face 587a, previously referred to. The block 587b is preferably formed as a casting by the shell molding process and is provided with a number of open-faced, cored recesses which are closed by the sub-plate 587d to provide the various connections between the valves. These cored recesses are indicated at 587e through 587q.

As shown in FIGURE 28, the pump 582 may have a pair of gears 582c and an inlet passage 582d to which the drop pipe 582a is connected. The delivery side of the pump gears opens to passage 587h and has a branch bore 582e opening into the accumulator cylinder 586a.

As shown in FIGURES 29 and 32, the cored passages 587j and 587q extend all the way through the body to the opposite face where they form exhaust ports and, in addition, exhaust passages 587r and 587s in FIGURES 30 and 31, intersect the valve bores 592a and 594a, respectively. In addition, vertical passages 587t, 587u, 587v, and 587w open to the top face of the block 587b to communicate with certain passages in a cover plate and valve assembly 588a shown in FIGURE 27.

The cover plate and valve assembly 588a closes the top ends of the valve bores 590a, 592a, 594a, and 596a. The bottom face of cover plate 588a is provided with grooved passages 588d, 588e, 588f, and 588g connecting the valves and passages as shown. Holes 588h and 588i overlie the valve bores 590a and 596a and receive the operating plungers for their respective solenoids 600 and 608, which are mounted on top of the plate 588a. Bore 588c has vertical connections, shown dotted, with grooves 588g and 588f and with bore 599a but not with groove 588d. Groove 588e vents bore 596a.

The bottom surface of the valve block 587b may be provided with a stop plate 587x, FIGURE 24, overlying, but not sealing the ends of the three vertical valve bores, 590a, 594a and 596a but sealing around the projecting stem of valve 592. Thus is formed the lower end of holding cylinder 604 diagramed in FIGURE 11. Cover plate 588a closes the top end of bore 592a to form the upper end of the holding cylinder.

Figure 16:
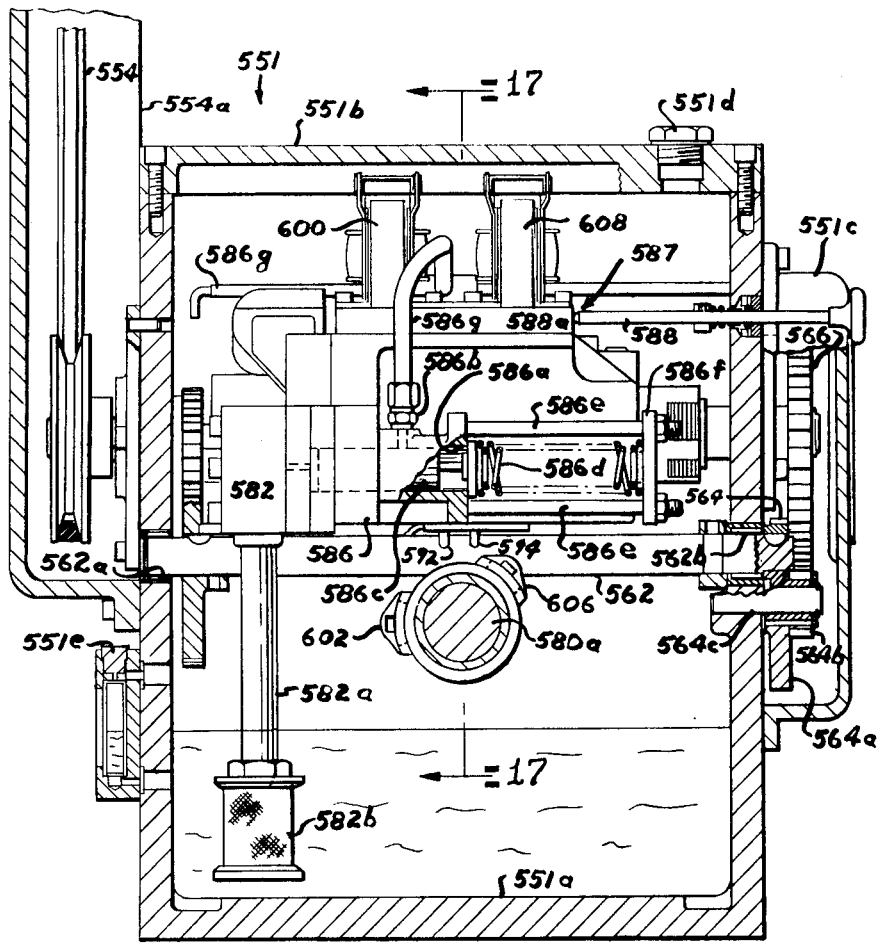
FIGURE 16 is a sectional view on line 16—16 of FIGURE 12.
Figure 17:
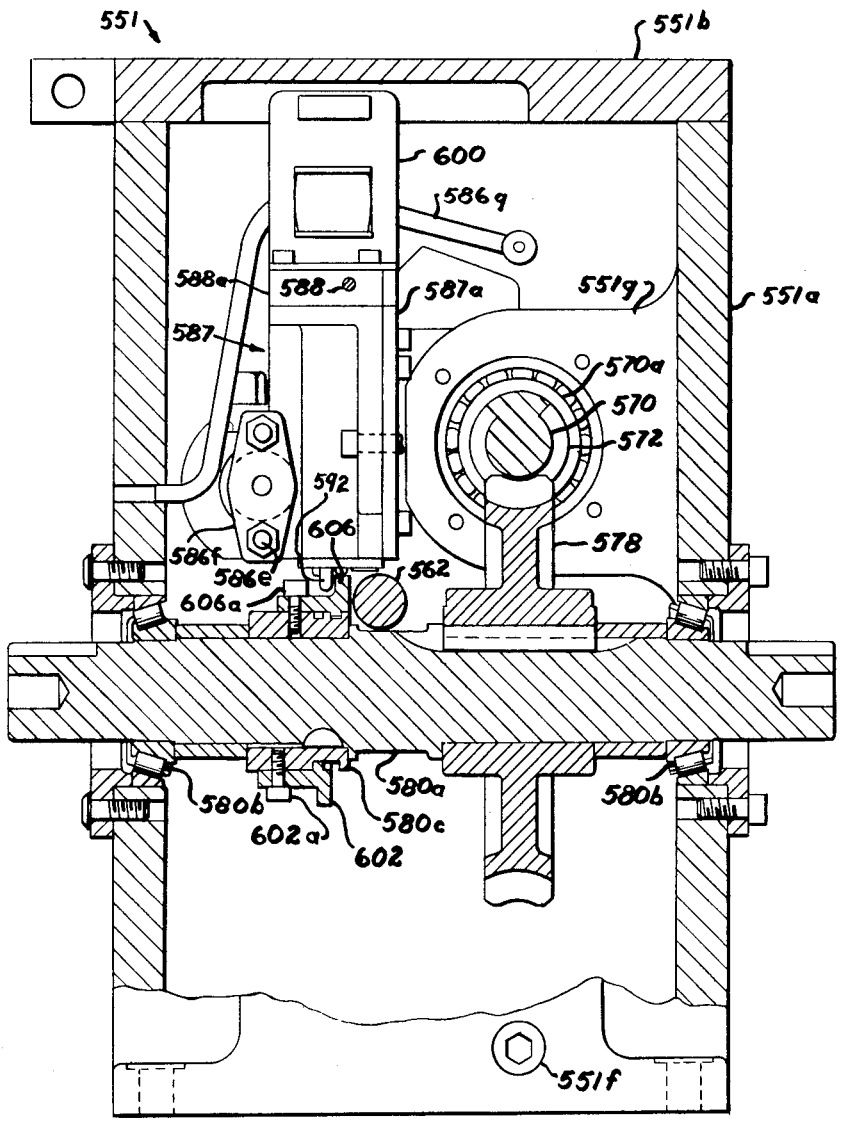
FIGURE 17 is a sectional view on line 17—17 of FIGURE 16.

The accumulator 586 is provided with a piston 586c, FIGURE 16, slidable in the bore 586a and urged to the left by a compound spring assembly 586d held in place by the studs 586e and abutment plate 586f. The spill-over port 586b may be connected with a lubricant distributing pipe system 586g for lubricating the various gears and bearings in the transmission and cam box.

Figure 14:
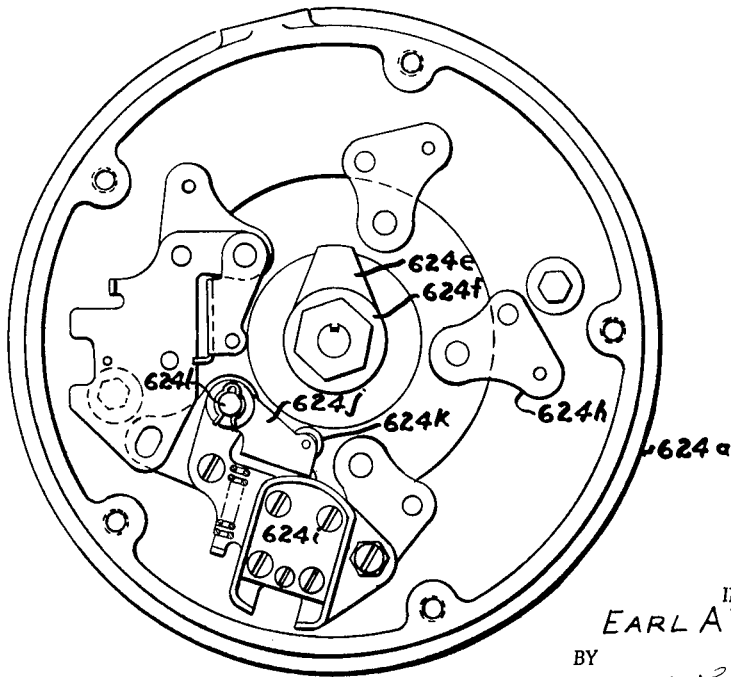
FIGURE 14 is a section on line 14—14 of FIGURE 12, showing the electrical cam mechanism.
Figure 19:
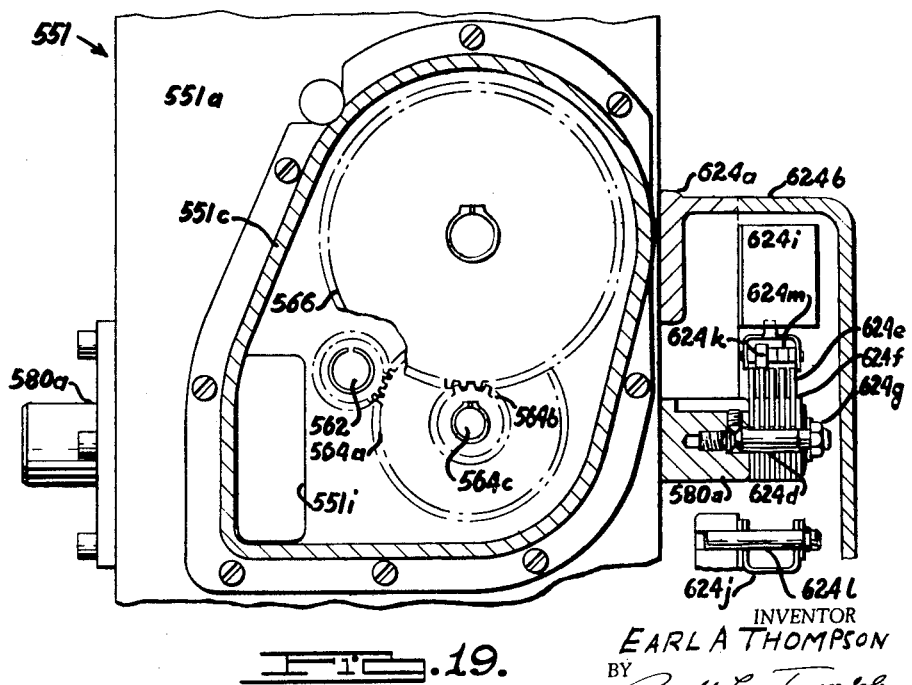
FIGURE 19 is a right end view, partly broken away, showing the mechanism of FIGURE 16.

Referring now to FIGURES 14 and 19, the end of the camshaft 580a opposite to that which drives the campulsator unit may be utilized for the purpose of providing coordinated electrical timing of the transmission itself and also of other machine devices, if desired. For this purpose a switch case comprising a base member 634a and a cover 624b is secured to the side of the transmission casing 551a. Secured to the end of the shaft 580a is is a pin 624d on which a stack of alternate leaf cams 624e and spacer washers 624f is mounted. The pin 624 has a keyway and each of the washers 624f has a tonque engaging that keyway, whereas the leaf cams 624e have round holes and are free to rotate around the pin 624d. A clamping nut 624g serves to clamp the assembly tightly together when the cams have been adjusted in a desired relationship thus preventing relative rotation. The base 624a has a plurality of mounting pads 624h for the reception of switch assemblies 624i. Each of these may include a follower lever 624j having a roller 624k engageable with only one of the cams 624e. The follower levers are pivoted at 624l. Suitable spacer washers 624m may be mounted along side rollers 624k so as to position each roller in alignment with only one of the cams 624e, as shown in FIGURE 19. The switch assemblies 624i may be of any suitable form, having an actuating plunger which may be depressed by the motion of the follower lever 624j.

It will thus be seen that the present invention has provided an improved programming and motion transferring system for actuation of machine elements in which any of a variety of predetermined cycles of motions may be performed in sequence reliably and efficiently.

The invention furthermore provides a system wherein all motions receive both control and power from a cam, and in which the system is maintained under a pre-load or bias from a common accumulator system which assures that all lost motion will be take up. The biasing system and the replenishing system furthermore are so arranged as to assure positive pressurization of the liquid columns at all times, even during replenishment, and any entrainment of air into the liquid columns is prevented by reason of the quiescent pools of liquid in the two reservoirs under high and low pressure, respectively.

The invention further provides for a multi-section system in which energy may be transferred from one section to another through the return biasing system, thereby minimizing the peak power requirements.

While the two forms of embodiment of the invention as herein disclosed constitute preferred forms, it is to be understood that other forms might be adopted, all coming within the scope of the claims which follow.

What is claimed is as follows:

1. A self-controlling multi-speed motion programming device comprising an input shaft, a first power train driven by the input shaft and including reduction gearing and a clutch, a second power train also driven by the input shaft and including a second clutch, an output member adapted to be driven by either power train selectively and including a driven shaft, a casing including bearing means for the shafts and power trains, cam means driven by the output shaft, and means operated by the cam means for selectively disengaging one clutch and engaging the other with each revolution of the output shaft.

2. A self-controlling multi-speed motion programming device comprising an input shaft, a first power train driven by the input shaft and including reduction gearing and a clutch, a second power train also driven by the input shaft and including a second clutch, an output member adapted to be driven by either power train selectively and including a driven shaft, a casing including bearing means for the shafts and power trains, cam means driven by the output shaft, and means operated by the cam means for selectively disengaging one clutch and engaging the other with each revolution of the output shaft, the last named means including a hydraulic pump and control valve formed as a unitary assembly and removably mounted in the casing to be operated from the input shaft to control said clutches.

3. A self-controlling multi-speed motion programming device comprising an input shaft, an output shaft, means for starting and stopping the output shaft, a first power train driven by the input shaft and including reduction gearing and a hydraulically operated clutch which when engaged drives the output shaft, a second power train also driven by the input shaft and including a second hydraulically operated clutch which when engaged drives the output shaft, a casing including bearing means for the shafts and power trains, a control assembly for controlling said clutches, said assembly being removably mounted as a unit in the casing and including, valve means and including a pump having a driving element engageable with one of the power trains for supplying fluid for operating clutches, cam means driven by the output member for operating the valve means to engage one clutch and disengage the other clutch to change the speed of the output member at least once each revolution thereof, and independent means for operating the valve means to start and stop the output member.

4. A self-controlling multi-speed motion programming device comprising an input shaft, an output shaft, means for starting and stopping the output shaft, a first power train driven by the input shaft and including reduction gearing and a hydraulically operated clutch which when engaged drives the output shaft, a second power train also driven by the input shaft and including a second hydraulically operated clutch which when engaged drives the output shaft, a casing including bearing means for the shafts and power trains, a control assembly for controlling said clutches, said assembly being removably mounted as a unit in the casing and including valve means and including a pump having a driving element engageable with one of the power trains for supplying fluid for operating clutches, a fluid pressure reservoir supplied by the pump and connected to the valve means, cam means driven by the output member for operating the valve means to engage one clutch and disengage the other clutch to change the speed of the output member at least once each revolution thereof, and independent means for operating the valve means to start and stop the output member.

5. A self-controlling multi-speed gear box comprising an input shaft, a first power train driven by the input shaft and including reduction gearing and a hydraulically operated clutch, a second power train also driven by the input shaft and including a second hydraulically operated clutch, an output member adapted to be driven by either power train selectively and including a driven shaft, a casing including bearing means for the shafts and power trains, means forming a mounting surface having fluid conduits therein communicating with the clutches, and a control assembly having a pump and valve means removably mounted on said surface and connected to said conduits with the pump in removable driving relation to the input shaft.

6. A control sub-assembly for a multi-speed gear box comprising a pump, a valve body having a plurality of control valves, means forming a mounting surface on the valve body, a pump driving means engageable with a power source by movement perpendicular to the mounting surface, a series of recesses in the valve body forming connections to the valves, a plate overlying the recesses and providing said mounting surface, and passageways extending through the plate between certain of the recesses and the mounting surface.

7. A self-controlling multi-speed motion programming device comprising an input shaft, a first power train driven by the input shaft and including reduction gearing and a clutch, a second power train also driven by the input shaft and including a second clutch, an output member adapted to be driven by either power train selectively and including a driven shaft, cam means driven by the output shaft, and means operated by the cam means for selectively disengaging one clutch and engaging the other with each revolution of the output shaft.

8. A two-speed uni-directional rotary power transmitting device comprising in combination an input shaft, an output shaft, a transmission driven by the input shaft for rotating the output shaft in the same sense of rotation selectively at two fixed speed ratios with respect to the input shaft, and means responsive to rotation of the output shaft for changing the speed ratio of the transmission to drive the output shaft at one ratio during one part of each rotation of the output shaft and at another speed ratio during another part of such rotation of the output shaft.

9. A self-controlling two-speed rotary uni-directional power transmitting device comprising in combination an input shaft, a first power train driven by the input shaft and including reduction gearing and a clutch, a second power train also driven by the input shaft and including a second clutch, a driven shaft adapted to be rotated by either power train selectively, cam means driven by the output shaft, means for operating the clutches whereby when one clutch is engaged the other clutch is disengaged, and means operated by the cam means for operating the clutch operating means to engage each clutch alone during a portion of each rotation of the output shaft.

References Cited by the Examiner
UNITED STATES PATENTS

| 466,224 | 12/91 | Curtis | 74—322 |
|---|---|---|---|
| 944,978 | 12/09 | Temple | 74—232 X |
| 2,916,929 | 12/59 | Neracher et al. | |

DON A. WAITE, *Primary Examiner.*